Patented Apr. 12, 1949

2,467,283

UNITED STATES PATENT OFFICE 2,467,283

FISCHER-TROPSCH CATALYST AND ITS PREPARATION

Benjamin R. Warner, Chicago, Ill., assignor to Gulf Research & Development Company, Pittsburgh, Pa., a corporation of Delaware No Drawing. Application February 27, 1947, Serial No. 731,403

9 Claims. (Cl. 252—474)

This invention relates to catalysts for the synthesis of hydrocarbons, and more particularly, to catalysts for the synthesis of hydrocarbons from hydrogen and carbon monoxide.

The catalysts heretofore used commercially for the synthesis of hydrocarbons from hydrogen and carbon monoxide have usually comprised cobalt, with various additions of activators such as thoria and the like. Although other metals suitable as catalysts for the synthesis are known, such as iron, nickel and others, the greater activity of cobalt catalysts has heretofore militated against extensive use of such other metals. However, the use of cobalt catalysts is not entirely desirable from a commercial standpoint despite their greater activity, because the great expense involved in the preparation of such catalysts has necessitated elaborate and costly systems for recovery of spent catalyst values after the catalyst has lost its activity during the course of a synthesis. Furthermore, the cobalt catalysts have the disadvantages of producing predominantly straight-chain saturated hydrocarbons of low octane number in the motor fuel boiling range, and an excessive amount of high molecular weight wax-like hydrocarbons on the catalyst itself during the course of a synthesis. The latter phenomenon reduces the activity of the catalyst and necessitates frequent removal of the wax-like hydrocarbons in order to permit of continued catalyst activity throughout the synthesis. The necessity of removing the wax requires the obviously disadvantageous procedure of interrupting the synthesis at periodic intervals.

It has long been desirable to use a less expensive metal as a catalyst in the synthesis of hydrocarbons from hydrogen and carbon monoxide. To this end, attempts have been made to use finely divided iron. A catalyst of this nature would not require elaborate and costly recovery procedures for the deactivated catalyst since, in the ordinary course, when the iron catalyst becomes deactivated, it is sufficiently cheap simply to be discarded. However, the iron catalysts heretofore known have not possessed a sufficiently great activity to warrant their commercial use for the synthesis of hydrocarbons. Furthermore, it has been typical of such iron catalysts that a large portion of the carbon monoxide contained in the synthesis gas is converted during the synthesis to carbon dioxide instead of to the more valuable hydrocarbons desired.

It is an object of this invention, therefore, to provide an iron catalyst for the synthesis of hydrocarbons from hydrogen and carbon monoxide which will compare favorably in activity with cobalt catalysts.

It is a further object of this invention to provide an iron catalyst which will not result in the production of excessive amounts of high molecular weight wax-like hydrocarbons during the synthesis, and, at the same time, will produce hydrocarbons boiling in the motor fuel range which have a higher octane number than those obtained from the use of cobalt catalysts.

It is a further object of this invention to provide an iron catalyst which will not result in the excessive production of carbon dioxide during the synthesis.

These and other objects are achieved by the present invention wherein, for the synthesis of hydrocarbons from hydrogen and carbon monoxide, I provide an iron catalyst prepared by adding to a water-soluble iron salt a water-soluble alkaline compound to the point of incipient precipitation, and then adding gallic acid to complete the precipitation.

More particularly, to a warm aqueous solution of a water-soluble iron salt, such as ferric nitrate, there is added with stirring a water-soluble alkaline compound, such as potassium carbonate, to the point of incipient precipitation. At this point, an aqueous solution of gallic acid is added with stirring and precipitation takes place. The precipitate is filtered, washed with water and dried. The dry precipitate may then be used as a catalyst in the synthesis of hydrocarbons from hydrogen and carbon monoxide. The catalyst may initially be reduced with hydrogen in any suitable manner prior to use in the hydrocarbon synthesis, or it may be used directly in the synthesis without a separate prior reduction, in which case reduction will take place prior to any synthesizing effect.

The manner in which the gallic acid acts to complete the precipitation and the method by which it affects the precipitate are not fully understood. While I no not desire to be limited by any theory as to the action of the gallic acid, it is my present belief that the gallic acid is either absorbed on the precipitate or reacts therewith in some manner to produce the unusual iron catalyst of my invention. In any event, it is certain that the gallic acid produces profound changes in the nature of the catalyst as evidenced by its enhanced activity and lower carbon dioxide production in the synthesis. Furthermore, X-ray examination of iron catalysts after use in the synthesis of hydrocarbons shows that an iron catalyst prepared without gallic acid contains iron carbide and carbon and is not pyrophoric; whereas an iron catalyst prepared in accordance with my invention shows little iron carbide, no carbon, and is extremely pyrophoric.

Any water-soluble iron salt may be used as a starting material in the preparation of my catalysts. Either ferric or ferrous salts may be used. In general, the ferric salts are preferred because they are cheaper and more stable than the ferrous salts. Ferric nitrate is preferred among the ferric salts because the nitrate ion is more readily washed out of the precipitated iron compound and is decomposed at the temperatures of either the reduction or synthesis. Traces of sulfate and chloride ion on the finished catalyst tend to act as poisons, and therefore the use of iron sulfates and chlorides as starting materials in the preparation of the catalyst is not preferred because sulfate and chloride ions are difficult to remove completely.

Any water-soluble alkaline compound, that is, a compound which will yield hydroxyl ions in aqueous solution, may be used to bring the iron salt to the point of incipient precipitation. For example, the alkali metal hydroxides, such as sodium and potassium hydroxides, the alkali metal carbonates, such as sodium and potassium carbonates, ammonium hydroxide and the water soluble amines, such as triethanolamine, are suitable.

As previously stated, the water-soluble alkaline compound is added to the water-soluble iron salt in an amount sufficient to produce incipient but not complete precipitation. The exact amount of water-soluble alkaline compound to add to produce incipient precipitation may vary depending on whether a ferrous or ferric salt is used as the starting material. Regardless of the type of iron salt used, however, the water-soluble alkaline compound should not be added in any substantial excess of the amount theoretically necessary to precipitate iron hydroxide. For example, when the iron salt is a ferric salt, the alkaline compound is added in such an amount that the pH of the resulting solution lies in the range 2.1 to 2.3. When the iron salt is a ferrous salt, the alkaline compound is added in such an amount that the pH of the resulting solution lies in the range 5.3 to 5.5.

The amount of gallic acid added when the mixture of water-soluble iron salt and water-soluble alkaline compound is at the point of incipient precipitation is such that the iron compound is completely precipitated from the mixture. In general, at least 0.08 mol of gallic acid per mol of iron salt used as starting material is required. Although larger amounts of gallic acid may be used, no advantage is ordinarily obtained thereby, and I prefer not to use more than 0.15 mol of gallic acid per mol of iron salt. When further amounts of alkaline compound are added after precipitation of the iron compound to precipitate activator compounds, as hereinafter disclosed, the larger amounts of gallic acid are preferably used to offset any possible consumption of gallic acid by the alkaline compound.

Various promoters or activators may be added to the iron catalyst and, in addition, various supporting materials for the finished catalyst such as kieselguhr, silica gel and the like may be used. The activators and the supporting materials are conveniently added to the water-soluble iron salt prior to addition of the water-soluble alkaline compound. In such case, the activator is also added in the form of a water-soluble salt. When it is desired to incorporate an activator which is to be precipitated by the water-soluble alkaline compound, it is preferred to complete the precipitation of the iron compound first in the manner described above, that is, by the addition of water-soluble alkaline compound to the point of incipient precipitation followed by the addition of gallic acid to complete the precipitation of the iron compound, and then to add additional water-soluble alkaline compound to precipitate the activator. In such case, greater amounts of gallic acid, as set forth hereinabove, are preferably used to precipitate the iron compound, in order to offset any leaching effect on the gallic acid occasioned by the addition of further amounts of water-soluble alkaline compound after the gallic acid has been used.

Among the activators which may be used are manganous oxide, copper, magnesium oxide and calcium oxide. The activators are generally used in a minor amount, and the proportion of activator to iron metal in the reduced catalyst may vary from about 1 per cent to 25 per cent. The amount of activator used in any specific instance will vary depending on the specific activator chosen. Also more than one activator may be employed.

The following examples further illustrate the invention. Unless otherwise stated all parts are by weight.

Example 1.—To 607 parts of $Fe(NO_3)_3 \cdot 9H_2O$ dissolved in 3000 parts of water and heated between about 70° and 90° C., there was added, with stirring, a solution of 290 parts of potassium carbonate dissolved in 450 parts of water. At this point of incipient precipitation, 15 parts of gallic acid dissolved in 1000 parts of hot water were added and precipitation took place. The precipitate was filtered, washed with water until the washing showed negligible nitrate content and oven dried at 110° C. As previously stated, carriers or supporting materials for the finished catalyst, such as kieselguhr, may be added to the solution prior to precipitation. Other water-soluble alkaline compounds, such as ammonium hydroxide, may be used in lieu of the potassium carbonate.

Example 2.—To a hot solution, between about 70° and 90° C., of 607 parts of $Fe(NO_3)_3 \cdot 9H_2O$ and 28 parts of $Mn(NO_3)_2$ dissolved in 3000 parts of water, there was added, with stirring, a solution of 290 parts of potassium carbonate in 450 parts of water. At this point of incipient precipitation, 30 parts of gallic acid dissolved in 1000 parts of hot water was added and precipitation of the iron compound took place. At this point, the pH of the mixture is on the acid side and the manganous compound does not precipitate. In order to precipitate the manganous compound which becomes the activator an additional 50 parts of potassium carbonate dissolved in 500 parts of water was added. The precipitate was filtered and washed with hot water until it showed negligible nitrate content. The catalyst was then dried at 110° C. The larger amount of gallic acid shown in this example is used, in accordance with the previous disclosure, to offset the leaching effect of the additional water-soluble alkaline compound used to precipitate the activator.

As previously stated, the catalysts obtained in accordance with my invention may be reduced with hydrogen prior to use in synthesis, or they may be reduced directly in the synthesis operation. Reduction of the catalyst prior to the synthesis may be accomplished in any known manner, as for example, by passing hydrogen over the catalyst at 500° C. Another advantage of the catalysts of my invention is that they are more readily reduced than other iron catalysts prepared without the addition of gallic acid. Thus, in general, the catalysts of this invention are reduced about half again as fast as such other iron catalysts.

The catalysts of my invention may be used for the synthesis of hydrocarbons from hydrogen and carbon monoxide in any known manner. Thus, they may be used in a process wherein the synthesis gas mixture of hydrogen and carbon monoxide is passed over thin layers of catalyst in a reactor and products of the synthesis are recovered from the exit gases. If desired, the "fluidized" catalyst technique may be used wherein the catalyst, in finely divided form, is suspended in a stream of the synthesis gas mixture and passed into a reactor. The catalyst may also be suspended in an inert liquid reaction medium into which the synthesis gas mixture is passed.

The reaction conditions for the synthesis may vary widely. In general, the temperature ranges from about 200° to 350° C.; the pressure may vary from 1 atmosphere to about 10 atmospheres; the space velocity (volumes of synthesis gas per volume of catalyst per hour) may range from about 100 to 400; and the mol ratio of hydrogen to carbon monoxide in the synthesis gas mixture may vary from about 2:1 to 1:1. If desired, unreacted synthesis gas mixture may be recycled to the reactor. The catalysts of my invention may be used in finely divided form or they may be agglomerated or pelleted, if desired.

The following example shows the enhanced activity, comparable to prior cobalt catalysts, which is obtained from the use of the catalysts of my invention.

*Example 3.*—A synthesis gas mixture of hydrogen and carbon monoxide in a mol ratio of 1.9:1 was passed into a reactor over a reduced catalyst prepared by the method of Example 1 at a temperature of about 340° C. and at a space velocity of about 156. Under these conditions, 96 per cent of the carbon monoxide in the synthesis gas was converted. A yield of $C_2$ and higher hydrocarbons was obtained amounting to 131 grams per cubic meter of the synthesis gas. This compares favorably with previous cobalt catalysts which have yielded approximately 130 grams of similar hydrocarbons per cubic meter of synthesis gas.

*Example 4.*—In order to determine the relative activity of catalysts prepared with and without the use of gallic acid, the following syntheses were preformed using in both cases Fe-MnO cataylsts, one of which was prepared in accordance with Example 2 and the other of which was similarly prepared except that no gallic acid was used. The synthesis was conducted at a temperature of 260° C. using a mol ratio of hydrogen to carbon monoxide of about 1.8:1 and a space velocity of about 160. The space-time-yield, that is, the volume of carbon monoxide reacted per volume of catalyst per hour, was 19 for the gallic acid cataylst and only 10.5 for the catalyst prepared without gallic acid. As shown by this example, the cataylsts of my invention have an activity almost twice as great as catalysts prepared without using gallic acid.

The use of the catalysts of my invention for the synthesis of hydrocarbons from hydrogen and carbon monoxide is described and claimed in my copending application Serial No. 28,060, filed May 19, 1948.

In addition to being cheaper than and as active as cobalt catalysts, the catalysts of my invention have the advantage of yielding largely liquid products of higher octane number. In this respect, they are markedly superior to the cobalt catalysts which produce large amounts of waxlike hydrocarbons. The latter are not only injurious to the synthesis in that they reduce the activity of the catalyst, but are not as valuable as the liquid products of the synthesis. As compared to iron catalysts prepared without the addition of gallic acid, the catalysts of my invention, among other advantages, have an enhanced activity, are more easily reduced, and do not produce excessive amounts of carbon dioxide.

What I claim is:

1. A process for preparing a catalyst suitable for use in the synthesis of hydrocarbons from hydrogen and carbon monoxide which comprises adding a water-soluble alkaline compound to an aqueous solution of a water-soluble iron salt to the point of incipient precipitation, then adding gallic acid to complete the precipitation, and recovering the resultant precipitate.

2. The process of claim 1, wherein the water-soluble iron salt is a ferric salt and the water-soluble alkaline compound is added in such amount that the pH of the resulting solution lies in the range 2.1 to 2.3.

3. The process of claim 1, wherein the water-soluble iron salt is a ferrous salt and the water-soluble alkaline compound is added in such amount that the pH of the resulting solution lies in the range 5.3 to 5.5.

4. The process of claim 1, wherein the gallic acid is added in such an amount that the mol ratio of gallic acid to the water-soluble iron salt is not less than 0.08:1.

5. A process for preparing a catalyst suitable for use in the synthesis of hydrocarbons from hydrogen and carbon monoxide which comprises adding a water-soluble alkaline compound to an aqueous solution of a water-soluble ferric salt, the amount of water-soluble alkaline compound being such that the pH of the resulting solution lies in the range 2.1 to 2.3, then adding gallic acid in such amount that the mol ratio of gallic acid to ferric salt is not less than 0.08:1 thereby obtaining a precipitate, and recovering the precipitate.

6. A process for preparing a catalyst suitable for use in the synthesis of hydrocarbons from hydrogen and carbon monoxide which comprises adding an aqueous solution of potassium carbonate to an aqueous solution of ferric nitrate, the amount of potassium carbonate being such that the pH of the resulting solution lies in the range 2.1 to 2.3, then adding gallic acid in such amount that the mol ratio of gallic acid to ferric nitrate ranges from 0.08:1 to 0.15:1 thereby obtaining a precipitate, and recovering the precipitate.

7. A process for preparing a catalyst suitable for use in the synthesis of hydrocarbons from hydrogen and carbon monoxide which comprises adding an aqueous solution of potassium carbonate to an aqueous solution of ferric nitrate containing a small amount of manganous nitrate, the amount of potassium carbonate being such that the pH of the resulting solution lies in the range 2.1 to 2.3, then adding gallic acid in such amount that the mol ratio of gallic acid to ferric nitrate is not less than 0.8:1 thereby obtaining a precipitate from the ferric nitrate, adding a further amount of an aqueous solution of potassium carbonate to precipitate the manganous compound, and recovering the mixed precipitate.

8. A catalyst characterized by its enhanced activity and lower carbon dioxide production in the synthesis of hydrocarbons from hydrogen and carbon monoxide, said catalyst being obtainable by the process of claim 7.

9. A catalyst characterized by its enhanced activity and lower carbon dioxide production in the synthesis of hydrocarbons from hydrogen and carbon monoxide, said catalyst being obtainable by the process of claim 1.

BENJAMIN R. WARNER.

REFERENCES CITED

The following references are of record in the file of this patent:

UNITED STATES PATENTS

| Number | Name | Date |
|---|---|---|
| 1,540,445 | Wilson | June 2, 1925 |
| 2,156,904 | Ruthruff | May 2, 1939 |
| 2,183,145 | Michael et al. | Dec. 12, 1939 |
| 2,247,820 | Ruthruff | July 5, 1941 |

OTHER REFERENCES

Perkins et al., Journ. of the Chem. Soc. of London, vol. 83, page 199, part 1, (1903).

Chem. Zentr., page 1024, 1908 II.

Certificate of Correction

Patent No. 2,467,283. April 12, 1949.

BENJAMIN R. WARNER

It is hereby certified that errors appear in the printed specification of the above numbered patent requiring correction as follows:

Column 4, line 17, for the word "used" read *added*; column 8, line 10, list of references cited, for "July 5, 1941" read *July 1, 1941*;

and that the said Letters Patent should be read with these corrections therein that the same may conform to the record of the case in the Patent Office.

Signed and sealed this 6th day of September, A. D. 1949.

[SEAL]

THOMAS F. MURPHY,
*Assistant Commissioner of Patents.*